United States Patent [19]

Moritz et al.

[11] Patent Number: 5,048,283
[45] Date of Patent: Sep. 17, 1991

[54] GUIDE CHAIN FOR GUIDING ENERGY LINES

[75] Inventors: Werner Moritz, Siegen; Volker Jud, Wilnsdorf; Willibald Weber, Netphen, all of Fed. Rep. of Germany

[73] Assignee: Kabelschlepp Gesellschaft mit beschränkter Haftung, Siegen, Fed. Rep. of Germany

[21] Appl. No.: 562,634

[22] Filed: Aug. 3, 1990

[30] Foreign Application Priority Data

Aug. 26, 1989 [DE] Fed. Rep. of Germany ....... 3928238

[51] Int. Cl.$^5$ ............................................. F16G 13/16
[52] U.S. Cl. ..................................... 59/78.1; 59/900; 248/49
[58] Field of Search ........................... 59/78, 78.1, 900; 248/48, 49, 50, 51, 78

[56] References Cited

U.S. PATENT DOCUMENTS

| | | | |
|---|---|---|---|
| 3,921,388 | 11/1975 | Loos et al. | 59/78.1 |
| 4,672,805 | 6/1987 | Moritz | 59/78.1 |
| 4,800,714 | 1/1984 | Moritz | 59/900 |
| 4,858,424 | 8/1989 | Loding et al. | 59/78.1 |
| 4,885,908 | 12/1989 | Stöhr | 59/78.1 |

FOREIGN PATENT DOCUMENTS

| | | | |
|---|---|---|---|
| 0246402 | 11/1987 | European Pat. Off. | |
| 0286422 | 10/1988 | European Pat. Off. | 59/78.1 |
| 2255283 | 5/1974 | Fed. Rep. of Germany | |
| 2360227 | 6/1975 | Fed. Rep. of Germany | |
| 2417353 | 10/1975 | Fed. Rep. of Germany | |
| 1456119 | 11/1976 | United Kingdom | 59/78.1 |

*Primary Examiner*—David Jones
*Attorney, Agent, or Firm*—Robert W. Becker & Associats

[57] ABSTRACT

A guide or feeder chain for power and supply lines is provided. The chain includes chain links that comprise two spaced-apart link members that are disposed parallel to one another and are interconnected by crosspieces. The chain links have a reciprocal pivot angle delimited by abutment inserts. Exposed sides of the chain links are covered by cover plates secured to the crosspieces. End links of the chain are connected via connectors to a fixed connection at one end and to a movable consuming device at the other end. Some of the crosspieces, along a portion thereof disposed between the link members, have an enlarged cross-sectional configuration. The abutment inserts are interconnected via stems that extend into corresponding notches of the link members. A curved cover element is telescopically guided on one side of each cover plate. One end of each end link is embodied to connect to a link member, and the other end is provided with a pocket for the insertion of variously shaped connectors.

6 Claims, 6 Drawing Sheets

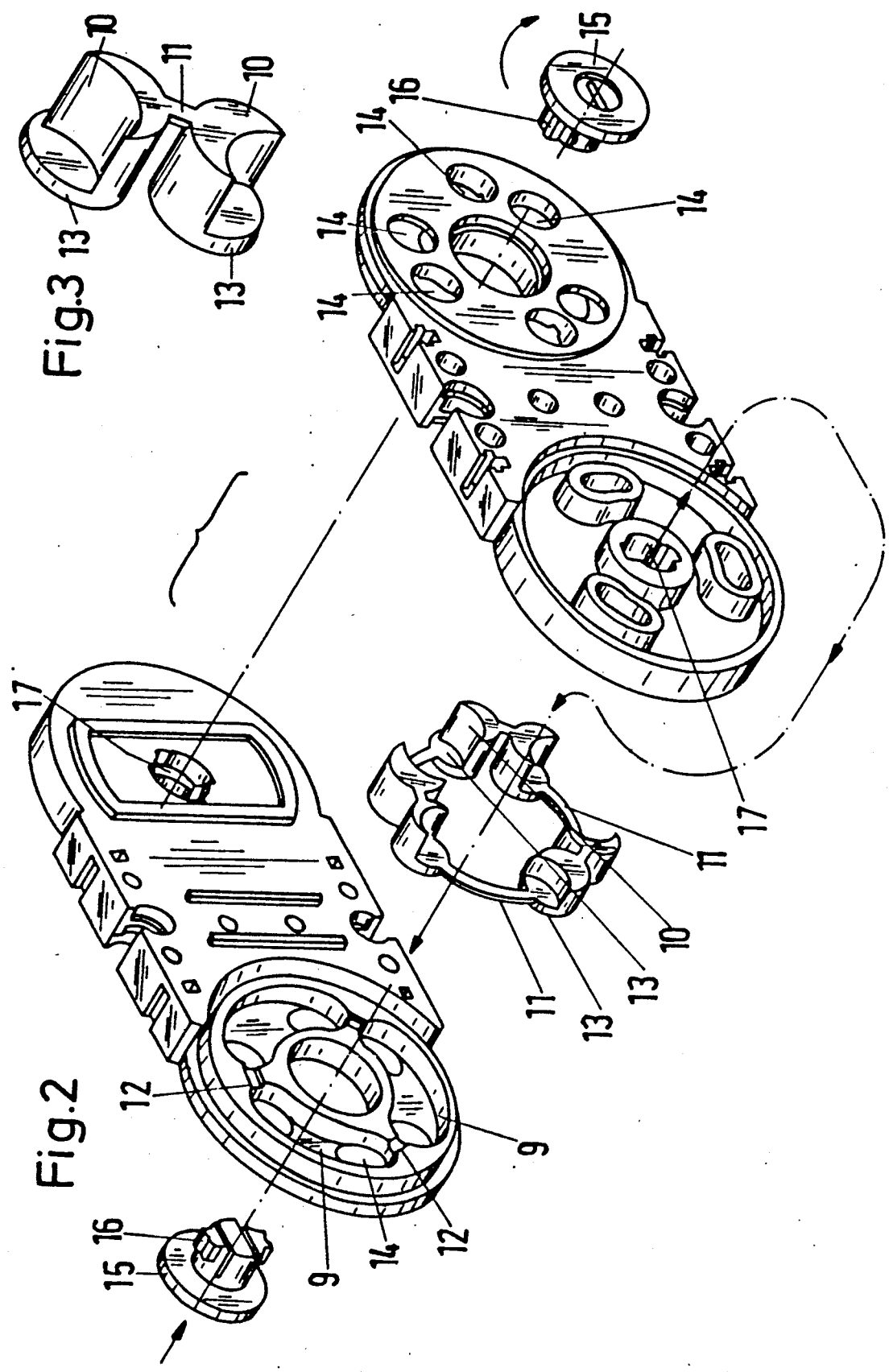

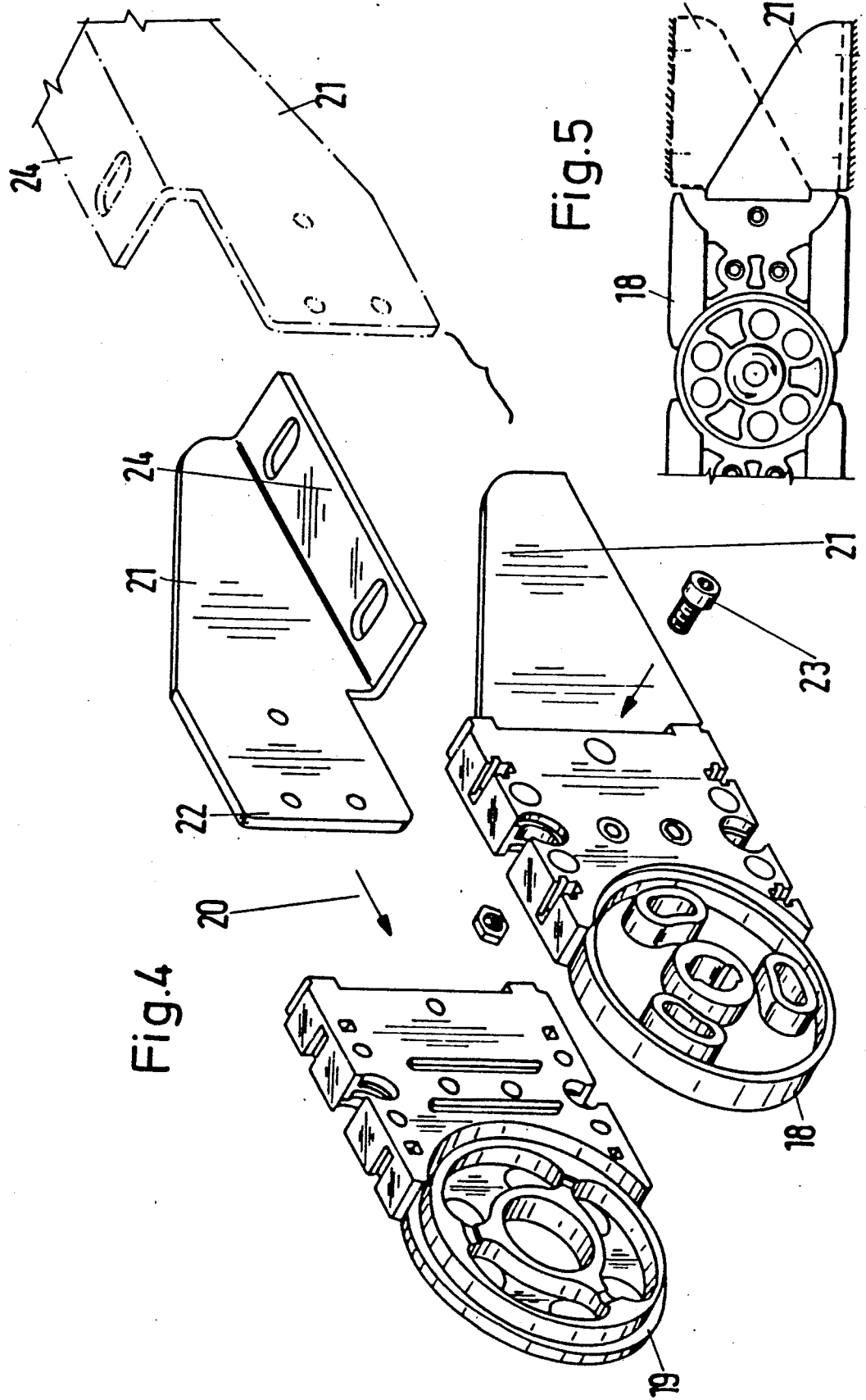

GUIDE CHAIN FOR GUIDING ENERGY LINES

BACKGROUND OF THE INVENTION

The present invention relates to a guide or feeder chain for power and supply lines, and includes chain links that comprise two spaced-apart link members that are disposed parallel to one another and are interconnected by crosspieces, with the chain links having a reciprocal pivot angle that is delimited by abutment inserts, with exposed sides of the chain links being covered by cover plates that are secured to the crosspieces, and with end links of the chain being connected, via brackets or connectors, on the one hand to a fixed connection and on the other hand to a movable consuming device.

DE-PS 23 60 227 discloses a guide or feeder chain where the reciprocal pivot angle of the chain links is delimited by abutment inserts that are loosely disposed in slots that are curved about the pivot axis. A drawback of this pivot angle delimitation, which actually functions quite well, is that during assembly the abutment inserts can be interchanged, and after assembly it is no longer possible to determine if the correct abutment inserts are disposed in all of the slots.

DE-PS 22 55 283 discloses a guide or feeder chain where the link members are connected by crosspieces that have a flattened cross-sectional configuration with rounded narrow sides, with the crosspieces being disposed in recesses of the link members or of separators, which recesses are provided with undercuts, whereupon the crosspieces are rotated about their longitudinal axis to secure them in a frictional and interlocking manner with the link members or separators. Although these separators have proven themselves in practice, for guide or feeder chains that have a great length and carrying weight, the stability of the crosspieces is not always adequate.

DE-PS 24 17 353 discloses a guide or feeder chain where the chain links are connected with crosspieces in which are disposed elastically deformable clamping lips of soft plastic between which the power and supply lines can be clamped. Unfortunately, this technology for fixing the position of power and supply lines that have different diameters can function well for only a certain range of differing diameters. This known clamping lip construction is not very suitable for extremely large or small diameters.

EP-OS 0 2460502 discloses a guide or feeder chain that is covered at the upper and lower sides by cover plates that are secured to the crosspieces. With one embodiment, the ends of the curved cover elements, which are disposed in the region of the pivot axis and span the gap between the cover plates of adjacent chain links, are guided in recesses of the link members. In another embodiment, the curved cover elements are integrally formed on one side of the cover plates, which are connected to the crosspieces. The first embodiment requires a corresponding construction of the link members, and with the second embodiment, the area between the cover plates and the cover elements is vulnerable to breaking.

Starting from these known constructions, it is an object of the present invention to provide a guide or feeder chain that can be assembled from various prefabricated parts so as to have various crosspieces, radii of curvature, stems, covers, and connectors for the purpose of being able to adapt to various applications.

BRIEF DESCRIPTION OF THE DRAWINGS

This object, and other objects and advantages of the present invention, will appear more clearly from the following specification in conjunction with the accompanying schematic drawings, in which:

FIG. 2 is an exploded view showing two adjacent link members between which are disposed abutment inserts that have been connected into a ring;

FIG. 3 shows two abutment inserts that are connected by a stem;

FIG. 4 is a partially exploded view showing two end links and associated connectors;

FIG. 5 is a side view of an end link;

SUMMARY OF THE INVENTION

Figure 1:
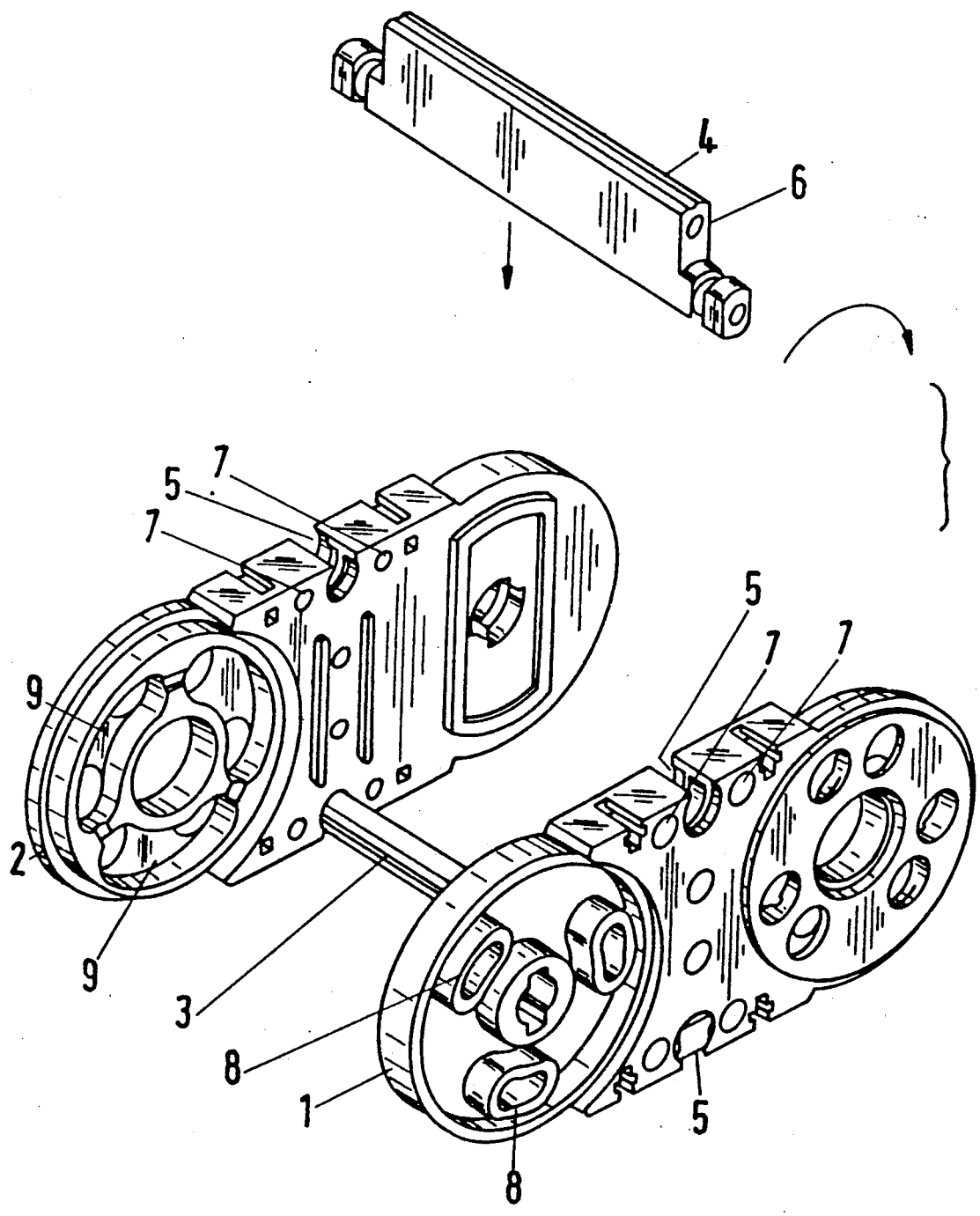
FIG. 1 is a partially exploded view of one exemplary embodiment of an inventive chain link having an asymmetrically widened crosspiece.

The guide or feeder chain of the present invention is characterized primarily in that:

(a) The crosspieces, along a portion thereof disposed between the link members, selectively have an enlarged cross-sectional configuration;

(b) The abutment inserts are interconnected via stems that fixedly extend into corresponding notches of the link members;

(c) A curved cover element is telescopically guided on one side of each cover plate, with the cover element covering the region of a link pivot axis and extending below an adjacent cover plate; and (d) One end of each end link is embodied to connect to a link member, with the other end being provided with a pocket for the insertion of variously shaped connectors.

Pursuant to one practical specific embodiment of the present invention, the crosspieces can have an asymmetrically widened profile between the chain link, or can also have a symmetrical configuration and can be provided on their inner side with a T-shaped groove for securing a brush with the ends thereof facing one another on both sides of the neutral plane of a chain link In the first variation, the crosspieces increase the stability of the chain links. In the second variation, the crosspieces not only increase the stability of the chain links, but they also permit the use of brushes, so that power and supply lines having extremely different diameters can be accommodated and can be kept separate from one another during operation of the guide or feeder chain.

The connection of the abutment inserts via stems to form an abutment ring, and also the connection of at least two abutment inserts for adjacent slots via a stem, has the advantage that the abutment inserts can no longer be interchanged, because they now fit only in the same position via their stem, in the corresponding notches between the slots of the link members. As a further improvement, it is proposed that the abutment inserts additionally be provided with round heads, and that round holes be provided in the link members in the region of the slots thereof, with the round heads of the abutment inserts then extending into these round holes so that when assembly of the guide or feeder chain is completed, these round heads are visible from the outside. On their visible side, the round heads can be provided with lettering or can also be marked in color to designate various radii of curvature In this way, after assembly it is immediately recognizable in which pivot connection abutment inserts are missing or where the wrong abutment inserts have been used.

Pursuant to a further specific embodiment of the present invention it is proposed that on one longitudinal side the cover plates have two halves and be provided with a slot for accommodating a curved cover element. The curved cover elements can then be inserted into the cover plates from the end. So that the curved covered elements cannot slide out of the accommodating slot of the cover plate, the cover elements are expediently provided on both longitudinal sides with stop ridges, one of which cannot move past the accommodating slot of the cover plate, and with the other extending below the adjacent cover plate. So that the curved cover elements are guided in the accommodating slot of the cover plates and in contact against the adjacent cover plates, profiled support members can be formed on the inner sides of the link members and can extend below the ends of the curved cover elements.

It is finally proposed to provide holes in the end links in the vicinity of the pockets thereof so as to be able to screw in the insertable connectors.

A guide or feeder chain that is constructed pursuant to the teaching of the present invention can be completed in many different ways and can thus be optimized for specific applications. For example, it is possible in place of simple crosspieces, and in conjunction with the same link members, to use crosspieces that increase the stability. If it is necessary to be able to guide power and supply lines having extremely different diameters and to keep these lines separate from one another, inwardly projecting brushes can be inserted into the crosspieces, with the bristles of these brushes extending about the power and supply lines in a protective manner and keeping them spaced apart. If the guide or feeder chain has to be covered or enclosed in order to protect the power and supply lines from hot shavings and/or dust, the cover plate with the telescopically provided cover elements can be placed upon the crosspieces from the outside. The connection situations for the end links, which change from case to case, can be established with variously shaped connectors, one end of each of which has an insertion end that fits into a pocket of an end link.

Further specific features of the present invention will be described in detail subsequently.

DESCRIPTION OF PREFERRED EMBODIMENTS

Referring now to the drawings in detail, various of the figures show a chain link comprised of two spaced-apart link members 1 and 2 that are disposed parallel to one another and are interconnected via crosspieces 3 and 4. Along their entire length, the crosspieces 3 have a flattened cross-sectional configuration with rounded narrow sides and can be placed into cutinto or gated recesses 5 in the narrow sides of the link members. The recesses 5 are provided with undercuts, and the crosspieces 3 can, after being placed in the recesses 5, be twisted about their longitudinal axis in order to frictionally and interlockingly connect them to the link members 1, 2. The other crosspiece 4, along a length that corresponds to the distance between the two link members, has an asymmetrical cross-sectional configuration in order to increase the stability of the guide or feeder chain. So that the crosspiece 4 cannot be unintentionally loosened, holes 6 are provided into which screws that extend through holes 7 of the loop members 1, 2 can be inserted.

The reciprocal pivot angle of adjacent chain links is delimited by abutment cams 8 that engage in curved cutouts 9 of an adjacent link member. The abutment cams B and cutouts 9 formed on a link member 1, 2 define a specific, maximum pivot angle that results in a specific radius of curvature for the guide or feeder chain. To reduce the pivot angle and enlarge the radius of curvature, abutment inserts 10 can be placed into the cutouts 9. In the embodiment illustrated in FIG. 2, these abutment inserts 10 are connected together by stems 11 to form a ring. However, as shown in the embodiment of FIG. 3, the abutment inserts 10 can also be connected in pairs by single stems 11 in order to preclude mistakes. Notches 12 that correspond with the stems 11 are provided for the abutment inserts 10 in the link members 1, 2 between the cutouts 9.

The abutment inserts 10 are provided with rounded heads 13 that extend into correspondingly shaped round holes 14 in the cutouts g and are visible from the outside.

Two chain links are held together via locking pins 15 that can be inserted along the pivot axis and that can catch in pivot holes 17 at one end of the link members 1, 2 via resilient disposed locking cams 16.

The first and last chain link of a guide or feeder chain comprises two end links 18, 19 that are cut off at one end and are provided with a pocket 20 into which can be inserted a connector 21 having an appropriate insertion end 22, whereupon the connector 21 can be secured via a screw 23. The connectors 21 can have differently shaped connection ends 24 that are adapted to the respective conditions (see for example the dot-dash line representation of one alternative in FIG. 4).

Figure 6:
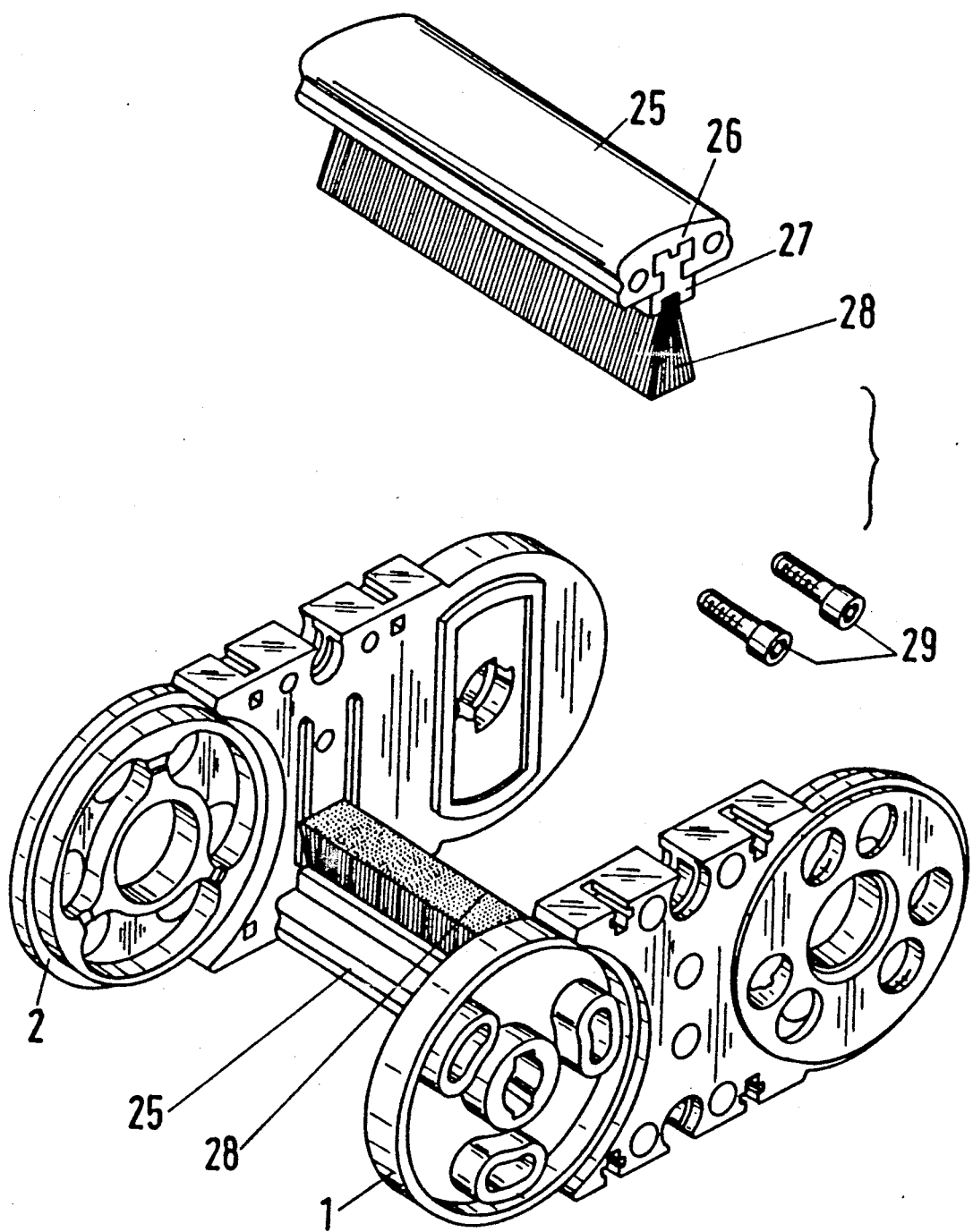
FIG. 6 is a partially exploded view of a chain link where brushes are secured in the crosspieces.

As illustrated in FIG. 6, in place of the crosspieces 3, 4 of FIG. 1, it is also possible to use wider crosspieces 25 that are provided on the inner side with a T-shaped groove 26 into which is inserted a bracket 27 for a brush 28. The two crosspieces 25 are secured to the link members 1, 2 by screws 29. The two inwardly projecting brushes 28 end on either side of the neutral plane of the chain links and can in a protective manner securely hold in place power and supply lines that have extremely different diameters, and can keep these lines separate from one another.

Figure 7:
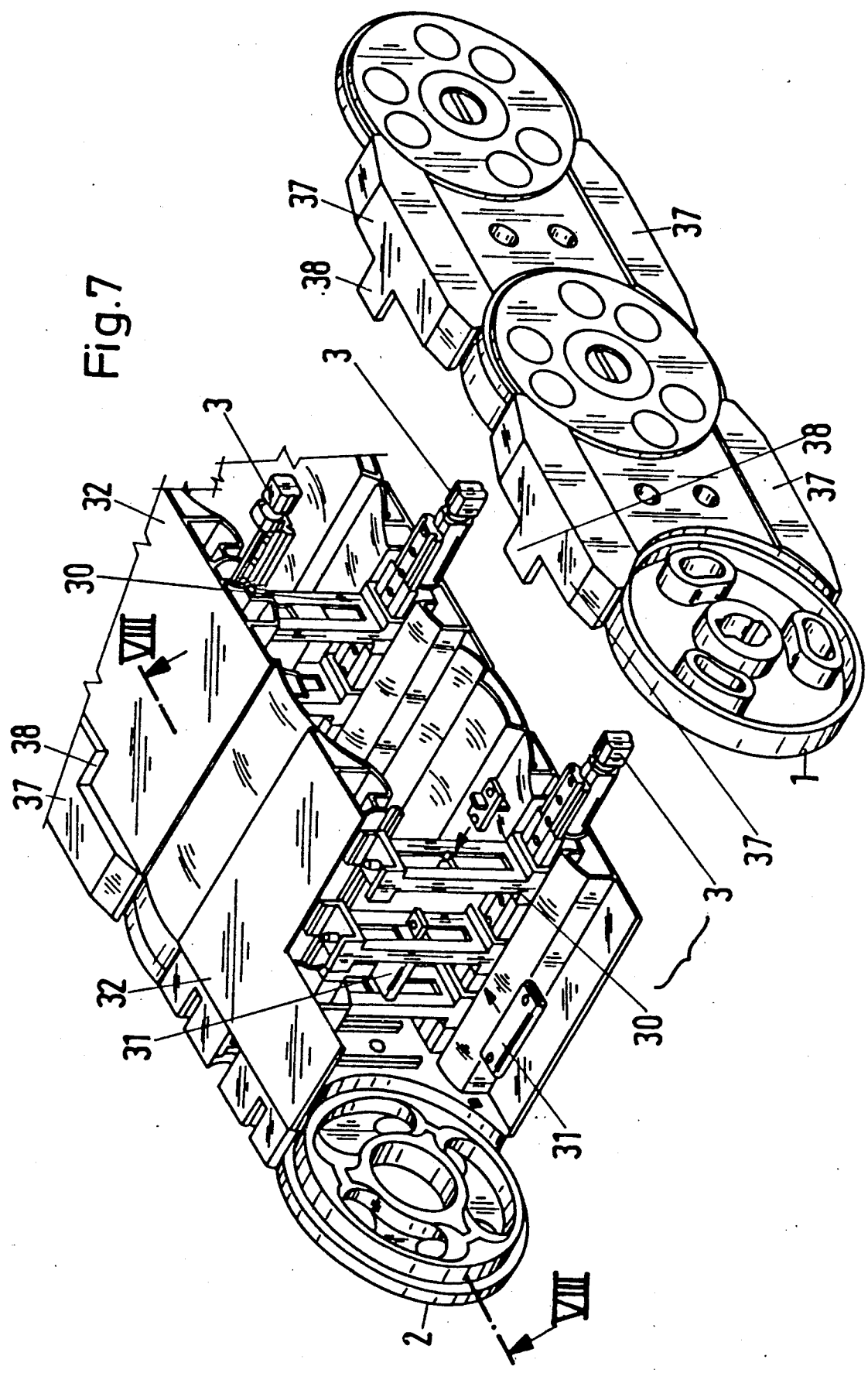
FIG. 7 is a partially exploded view of a chain link in which cover plates are secured on the crosspieces.
Figure 8:
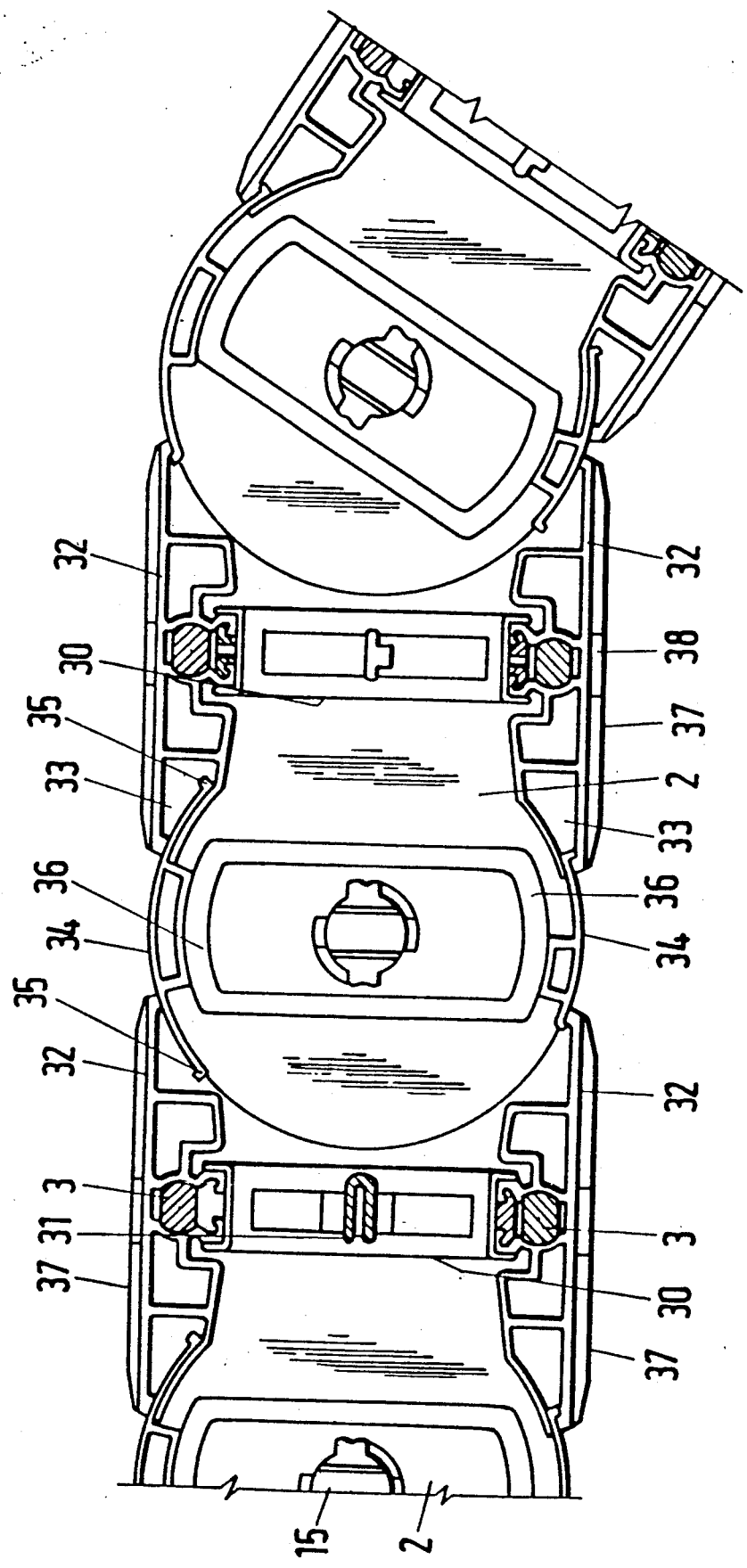
FIG. 8 is a cross-sectional view taken along the line VIII—VIII in FIG. 7.

In the embodiment illustrated in FIGS. 7 and 8, separators 30 having dividers 31 are disposed between the crosspieces 3 In addition, cover plates 32 are secured upon the crosspieces 3. Along one longitudinal side, these cover plates 32 have two halves and form a receiving slot for a curved cover element 34. The two ends of the curved cover elements 34 are provided with stop ridges 35 that on the one hand cannot slip out of the receiving slot 33, and at the other side extend below the adjacent cover plate 32. The ends of the cover elements 34 rest against profiled support members 36 that are formed on the link members 1 and 2.

In the covered guide or feeder chain illustrated in FIGS. 7 and 8, sliding skids 37 are placed upon the narrow sides of the link members 1 and 2. These sliding skids 37 are provided with an inwardly directed tab 38 to hold the cover plates 32 down.

The present invention is, of course, in no way restricted to the specific disclosure of the specification and drawings, but also encompasses any modifications within the scope of the appended claims.

What we claim is:

1. A guide or feeder chain or power and supply lines, including chain links that comprises two spaced-apart link members that are disposed parallel to one another and are interconnected by crosspieces, with said chain links having a reciprocal pivot angle that is delimited by abutment inserts, with exposed sides of said chain links covered by cover plates that are secured to said crosspieces, and with end links of said chain being connected, via connectors, on the one hand to a fixed connection and on the other hand to a movable consuming device, said guide or feeder chain further comprising:

at least some of said cross pieces, along a portion thereof disposed between said link members, having an enlarged cross-sectional configuration;

each of said abutment inserts being interconnected to at least one other abutment insert via a stem means that fixedly extends into corresponding notch means of said link members;

a respective curved cover element being telescopically guided on one side of each of said cover plates, with each cover element covering the region of a link pivot axis and extending below an adjacent cover plate;

each of said end links having two ends, one of which is embodied to connect to one of said link members, and the other of which is provided with a pocket to receive variously shaped ones of said connectors; and said at least some crosspieces having an asymmetrically widened profile.

2. A guide or feeder chain for power and supply lines, including chain links that comprise two spaced-apart link members that are disposed parallel to one another and are interconnected by crosspieces, with said chain links having a reciprocal pivot angle that is delimited by abutment inserts, with exposed sides of said chain links being covered by cover plates that are secured to said crosspieces, and with end links of said chain being connected, via connectors, on the one hand to a fixed connection and on the other hand to a movable consuming device, said guide or feeder chain further comprising:

said crosspieces, on an inwardly directed side thereof, being provided with a T-shaped grove for the securement of brushes, ends of which are disposed across from one another on either side of a neutral plane of a chain link.

3. A guide or feeder chain for power and supply lines, including chain links that comprise two spaced-apart link members that are disposed parallel to one another and are interconnected by crosspieces, with said chain links having a reciprocal pivot angle that is delimited by abutment inserts, with exposed sides of said chain links being covered by cover plates that are secured to said crosspieces, and with end links of said chain being connected, via connectors, on the one hand to a fixed connection and on the other hand to a movable consuming device, said guide or feeder chain further comprising:

said abutment inserts being provided with round heads that extend into round holes in said link members.

4. A guide or feeder chain for power and supply lines, including chain links that comprise two spaced-apart link members that are disposed parallel to one another and are interconnected by crosspieces, with said chain links having a reciprocal pivot angle that is delimited by abutment inserts, with exposed sides of said chain links being covered by cover plates that are secured to said crosspieces, and with end links of said chain being connected, via connectors, on the one hand to a fixed connection and on the other hand to a movable consuming device, said guide or feeder chain further comprising:

each of said cover plates, on one side, being embodied as two halves and forming a receiving slot for one of said curved cover elements, with opposite sides of said curved cover element being provided with stop ridges.

5. A guide or feeder chain for power and supply lines, according to claim 4, in which inwardly directed sides of said link members are provided with profiled support members for said curved cover elements.

6. A guide or feeder chain for power and supply lines, including chain links that comprise two spaced-apart link members that are disposed parallel to one another and are interconnected by crosspieces, with said chain links having a reciprocal pivot angle that is delimited by abutment inserts, with exposed sides of said chain being covered by cover plates that are secured to said crosspieces, and with end links of said chain being connected, via connectors, on the one hand to a fixed connection and on the other hand to a movable consuming device, further comprising:

said end links, in the region of said pockets, being provided with holes to receive screws to secure inserted connectors therein.

* * * * *